US012558769B2

(12) United States Patent
Holly et al.

(10) Patent No.: US 12,558,769 B2
(45) Date of Patent: Feb. 24, 2026

(54) OSCILLATING POWER TOOL WITH LIGHTING ASSEMBLY

(71) Applicant: MILWAUKEE ELECTRIC TOOL CORPORATION, Brookfield, WI (US)

(72) Inventors: Jeffrey S. Holly, West Bend, WI (US); Jacob N. Zimmerman, Pewaukee, WI (US); James C. Sitter, Milwaukee, WI (US); David A Bierdeman, New Berlin, WI (US); Andrew R. Schauer, Pewaukee, WI (US); Michael J. Panetta, Wauwatosa, WI (US); You Gen Liu, Dongguan (CN)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/780,147

(22) Filed: Jul. 22, 2024

(65) Prior Publication Data

US 2024/0375260 A1 Nov. 14, 2024

Related U.S. Application Data

(63) Continuation of application No. 17/620,492, filed as application No. PCT/US2021/036708 on Jun. 10, 2021, now Pat. No. 12,097,603.

(30) Foreign Application Priority Data

Jun. 12, 2020 (CN) .......................... 202021091957.9

(51) Int. Cl.
 B25F 5/00 (2006.01)
 B25F 5/02 (2006.01)
 (Continued)

(52) U.S. Cl.
 CPC .......... B25F 5/021 (2013.01); F21V 33/0084 (2013.01); B23D 59/00 (2013.01); B27B 19/006 (2013.01); F21Y 2115/10 (2016.08)

(58) Field of Classification Search
 CPC ......... B23D 59/00; B25B 21/02; B25F 5/021; B27B 19/006; F21V 33/0084; F21Y 2115/10
 See application file for complete search history.

(56) References Cited

U.S. PATENT DOCUMENTS

| 5,473,519 A | 12/1995 | McCallops et al. |
| 6,886,961 B2 | 5/2005 | Hara et al. |
(Continued)

FOREIGN PATENT DOCUMENTS

| CN | 201355025 Y | 12/2009 |
| CN | 204997585 U | 1/2016 |
(Continued)

OTHER PUBLICATIONS

International Search Report and Written Opinion for Application No. PCT/US2021/036708 dated Oct. 1, 2021 (10 pages).
(Continued)

*Primary Examiner* — Eyamindae C Jallow
(74) *Attorney, Agent, or Firm* — Michael Best & Friedrich LLP

(57) ABSTRACT

An oscillating power tool has a housing including a handle portion defining a handle axis and a head portion defining an output axis that is perpendicular to the handle axis. The head portion includes a front face intersected by the handle axis. A drive mechanism includes an output shaft configured to oscillate about the output axis in a rotational manner in response receiving torque from a motor. A lighting assembly is configured to illuminate a workpiece in front of the head portion of the housing. The lighting assembly includes a lens
(Continued)

arranged on the front face of the housing, a holder coupled to the lens, a plurality of printed circuit boards supported by the holder, and an LED arranged on each of the printed circuit boards. In response to being activated, the LEDs are configured to project a wide-angle beam of light through the lens.

20 Claims, 6 Drawing Sheets

(51) Int. Cl.
| | |
|---|---|
| *F21V 33/00* | (2006.01) |
| *B23D 59/00* | (2006.01) |
| *B27B 19/00* | (2006.01) |
| *F21Y 115/10* | (2016.01) |

(56) References Cited

U.S. PATENT DOCUMENTS

| | | | |
|---|---|---|---|
| 6,910,783 | B2 | 6/2005 | Mezei et al. |
| 7,185,998 | B2 | 3/2007 | Oomori et al. |
| 7,406,245 | B2 | 7/2008 | Page et al. |
| 7,677,752 | B2 | 3/2010 | Tadokoro et al. |
| 7,682,035 | B2 | 3/2010 | Wuensch et al. |
| 7,815,356 | B2 | 10/2010 | Lutz et al. |
| 7,850,325 | B2 | 12/2010 | Wall et al. |
| 7,914,167 | B2 | 3/2011 | Petersen |
| 7,934,847 | B2 | 5/2011 | Oomori et al. |
| 8,016,048 | B2 | 9/2011 | Ueda et al. |
| 8,042,966 | B2 | 10/2011 | Lutz et al. |
| 8,317,350 | B2 | 11/2012 | Friedman et al. |
| 8,328,381 | B2* | 12/2012 | Dixon ..................... B25F 5/021 |
| | | | 362/120 |
| 8,496,366 | B2 | 7/2013 | Leong |
| 8,506,108 | B2 | 8/2013 | Friedman et al. |
| 8,517,558 | B2 | 8/2013 | Oomori et al. |
| 8,820,955 | B2 | 9/2014 | Dixon et al. |
| 8,827,483 | B2 | 9/2014 | Dixon et al. |
| 9,028,088 | B2 | 5/2015 | Vanko et al. |
| 9,328,915 | B2 | 5/2016 | Vanko et al. |
| 9,352,458 | B2 | 5/2016 | Friedman et al. |
| 9,644,837 | B2 | 5/2017 | Vanko et al. |
| 9,682,466 | B2* | 6/2017 | Wessel .................. F21V 21/096 |
| 10,040,181 | B2 | 8/2018 | Fu et al. |
| 10,052,733 | B2 | 8/2018 | Ely et al. |

| | | | |
|---|---|---|---|
| 2005/0210643 | A1 | 9/2005 | Mezei et al. |
| 2007/0248307 | A1 | 10/2007 | Page et al. |
| 2008/0130264 | A1 | 6/2008 | Page et al. |
| 2010/0178856 | A1 | 7/2010 | Cruz |
| 2010/0294001 | A1 | 11/2010 | Page et al. |
| 2010/0328929 | A1 | 12/2010 | Lutz et al. |
| 2011/0058356 | A1* | 3/2011 | Friedman ................ B25F 5/021 |
| | | | 362/119 |
| 2011/0188232 | A1* | 8/2011 | Friedman .................. F21S 9/04 |
| | | | 362/119 |
| 2011/0199756 | A1 | 8/2011 | Oomori et al. |
| 2012/0326173 | A1* | 12/2012 | Liao ..................... H10H 20/831 |
| | | | 257/E33.062 |
| 2013/0021783 | A1* | 1/2013 | Vanko ..................... B25B 21/00 |
| | | | 362/119 |
| 2013/0236154 | A1 | 9/2013 | Page et al. |
| 2013/0244845 | A1 | 9/2013 | Nagy et al. |
| 2014/0068952 | A1 | 3/2014 | Soreo et al. |
| 2014/0190716 | A1 | 7/2014 | Sugiura et al. |
| 2016/0354889 | A1* | 12/2016 | Ely ................... B23Q 17/2404 |
| 2016/0354905 | A1* | 12/2016 | Ely ....................... B25B 21/008 |
| 2017/0106523 | A1 | 4/2017 | Pan |
| 2017/0167721 | A1* | 6/2017 | Padget .................... B25F 5/021 |
| 2017/0203421 | A1 | 7/2017 | Vanko et al. |
| 2018/0126538 | A1* | 5/2018 | Qiu ..................... G02B 6/0021 |
| 2018/0161951 | A1 | 6/2018 | Billings et al. |
| 2018/0222022 | A1 | 8/2018 | Kumagi et al. |
| 2021/0122017 | A1* | 4/2021 | Kelly ................... H05B 47/16 |

FOREIGN PATENT DOCUMENTS

| | | | |
|---|---|---|---|
| DE | 102012224448 | A1 | 7/2014 |
| DE | 102014203328 | A1 | 8/2015 |
| DE | 202015103986 | U1 | 8/2015 |
| EP | 3117964 | A1 | 1/2017 |
| GB | 2429181 | B | 7/2008 |
| JP | 2008062344 | A | 3/2008 |
| JP | 2011000654 | A | 1/2011 |
| JP | 2018094651 | A | 6/2018 |
| WO | 2015161997 | A1 | 10/2015 |
| WO | 2016066294 | A1 | 5/2016 |

OTHER PUBLICATIONS

Extended European Search Report for Application No. 21822532.4 dated Jul. 2, 2024 (8 pages).

* cited by examiner

OSCILLATING POWER TOOL WITH LIGHTING ASSEMBLY

CROSS-REFERENCE TO RELATED APPLICATIONS

This application is a continuation of U.S. patent application Ser. No. 17/620,492 filed on Dec. 17, 2021, now U.S. Pat. No. 12,097,603, which is a national stage filing under 35 U.S.C. § 371 of International Application No. PCT/US2021/036708 filed on Jun. 10, 2021, which claims priority to Chinese Utility Model Application No. 202021091957.9 filed on Jun. 12, 2020, now Chinese Patent No. ZL202021091957.9, the entire contents of all of which are incorporated herein by reference.

TECHNICAL FIELD

The present invention relates to power tools, in particular oscillating power tools, with lighting assemblies.

BACKGROUND

Power tools can include a lighting assembly to illuminate a workpiece.

SUMMARY OF THE INVENTION

The present invention provides, in a first aspect, an oscillating power tool comprising a housing including a handle portion defining a handle axis and a head portion defining an output axis that is perpendicular to the handle axis. The head portion includes a front face intersected by the handle axis. The power tool further comprises a motor and a drive mechanism positioned within the housing. The drive mechanism includes an output shaft configured to oscillate about the output axis in a rotational manner in response receiving torque from the motor. The power tool further comprises a lighting assembly configured to illuminate a workpiece in front of the head portion of the housing. The lighting assembly includes a lens arranged on the front face of the housing, a holder coupled to the lens, a plurality of printed circuit boards supported by the holder, and a light emitting diode arranged on each of the plurality of printed circuit boards. In response to being activated, the light emitting diodes are configured to project a wide-angle beam of light through the lens.

In one embodiment of the first aspect, the front face has a first arc length. An external portion of the lens has a second arc length. The second arc length is at least 50 percent of the first arc length.

In one embodiment of the first aspect, the second arc length is at least 75 percent of the first arc length.

In one embodiment of the first aspect, the second arc length is at least 90 percent of the first arc length.

In one embodiment of the first aspect, the oscillating power tool further comprises one or more wires electrically connecting the light emitting diodes to a power source. The holder includes a rib. The one or more wires are arranged between the rib and the plurality of printed circuit boards.

In one embodiment of the first aspect, the power source is a control circuit board.

In one embodiment of the first aspect, the oscillating power tool further comprises an adhesive on the one or more wires between the rib and the plurality of printed circuit boards.

In one embodiment of the first aspect, the lens includes an external portion that is visible from outside the housing and an internal portion that extends underneath the plurality of printed circuit boards. A gap is defined between each printed circuit board and the internal portion in a direction perpendicular to the handle axis.

In one embodiment of the first aspect, the lens is transparent and the holder is opaque.

In one embodiment of the first aspect, the holder includes a plurality of frames respectively extending along the plurality of printed circuit boards. Each frame defines a recess. Adhesive is arranged in each recess to secure, respectively, each printed circuit board to the holder.

In one embodiment of the first aspect, the lens has a protrusion that extends into a corresponding recess in the head portion of the housing to couple the lens to the housing.

In one embodiment of the first aspect, the protrusion is a lower protrusion and the recess is a lower recess. The lens includes a pair of oppositely-arranged side protrusions that respectively extend into a pair of corresponding side recesses in the head portion of the housing.

In one embodiment of the first aspect, the lens includes a post that fits within a corresponding bore in the holder to couple the holder to the lens.

In one embodiment of the first aspect, the oscillating power tool further comprises a battery pack to provide power to the motor and the plurality of printed circuit boards.

In one embodiment of the first aspect, the battery pack is intersected by the handle axis.

The present invention provides, in a second aspect, an oscillating power tool comprising a housing including a handle portion and a head portion defining an output axis and including a front face. The power tool further comprises a motor and a drive mechanism positioned within the housing. The drive mechanism includes an output shaft configured to oscillate about the output axis in a rotational manner in response receiving torque from the motor. The power tool further comprises a lighting assembly configured to illuminate a workpiece in front of the head portion of the housing. The lighting assembly includes a lens arranged on the front face of the housing. The lens includes an arcuate external portion that is visible from outside the housing and is flush with the front face. The lighting assembly also includes a holder coupled to the lens, a plurality of printed circuit boards supported by the holder, and a light emitting diode arranged on each of the plurality of printed circuit boards. In response to being activated, the light emitting diodes are configured to project a wide-angle beam of light through the lens.

In one embodiment of the second aspect, the front face has a first arc length, the arcuate external portion of the lens has a second arc length. The second arc length is at least 50 percent of the first arc length.

In one embodiment of the second aspect, the second arc length is at least 75 percent of the first arc length.

In one embodiment of the second aspect, the second arc length is at least 90 percent of the first arc length.

In one embodiment of the second aspect, the holder includes a plurality of frames respectively extending along the plurality of printed circuit boards, each frame defining a recess. Adhesive is arranged in each recess to secure, respectively, each printed circuit board to the holder.

The present invention provides, in a third aspect, a method of partially assembling a lighting assembly for use in a power tool. The method comprises arranging a plurality of printed circuit boards in a formation in a temporary fixture. Each of the plurality of printed circuit boards respectively includes a light emitting diode. The method further comprises electrically connecting adjacent printed circuit boards with a solid bridge conductor, which maintains the plurality of printed circuit boards in the formation. The method further comprises removing the plurality of printed circuit boards from the temporary fixture, coupling a lead wire, respectively, to each of a first of the plurality of printed circuit boards and a last of the plurality of printed circuit boards, and arranging the plurality of printed circuit boards, pre-arranged in the formation, within a holder configured to be coupled to the power tool.

In one embodiment of the third aspect, the formation has a semi-circular shape.

In one embodiment of the third aspect, the method further comprises arranging each of the plurality of printed circuit boards, respectively, along one of a plurality of frames of the holder.

In one embodiment of the third aspect, each of the plurality of frames includes a recess. The method further comprises applying adhesive in each of the recesses to secure the respective printed circuit boards to the holder.

In one embodiment of the third aspect, the method further comprises arranging one or more wires between a rib of the holder and the plurality of printed circuit boards.

In one embodiment of the third aspect, the method further comprises applying adhesive over the one or more wires after the one or more wires have been arranged between the rib and the plurality of printed circuit boards.

In one embodiment of the third aspect, the method further comprises bending each solid bridge conductor to a curvilinear shape before it is used to electrically connect adjacent pairs of printed circuit boards.

Any feature(s) described herein in relation to one aspect or embodiment may be combined with any other feature(s) described herein in relation to any other aspect or embodiment, as appropriate and applicable.

Other features and aspects of the invention will become apparent by consideration of the following detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

Figure 1:
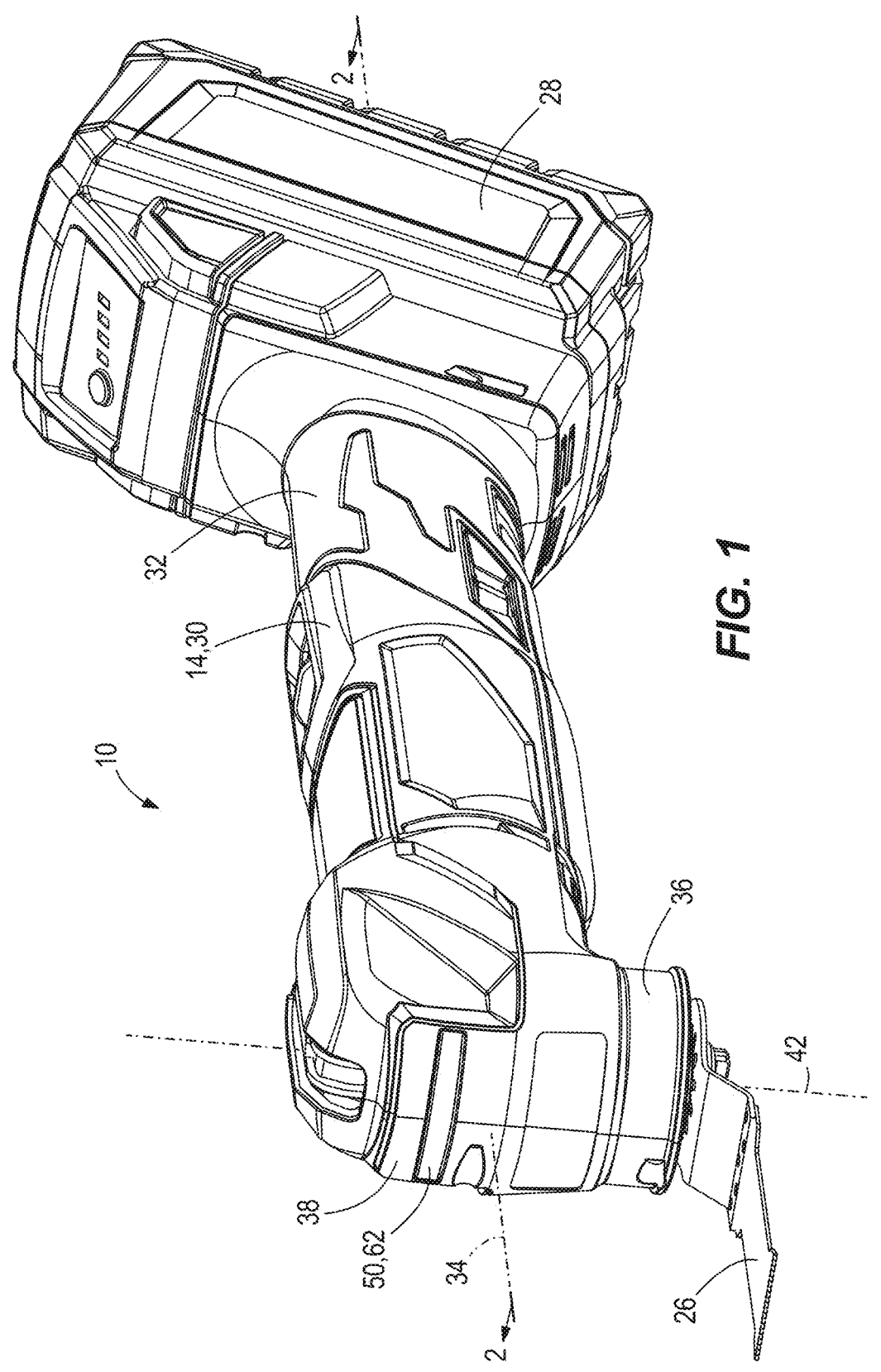
FIG. 1 is a perspective view of an oscillating power tool including a lighting assembly in accordance with an embodiment of the invention.
Figure 2:
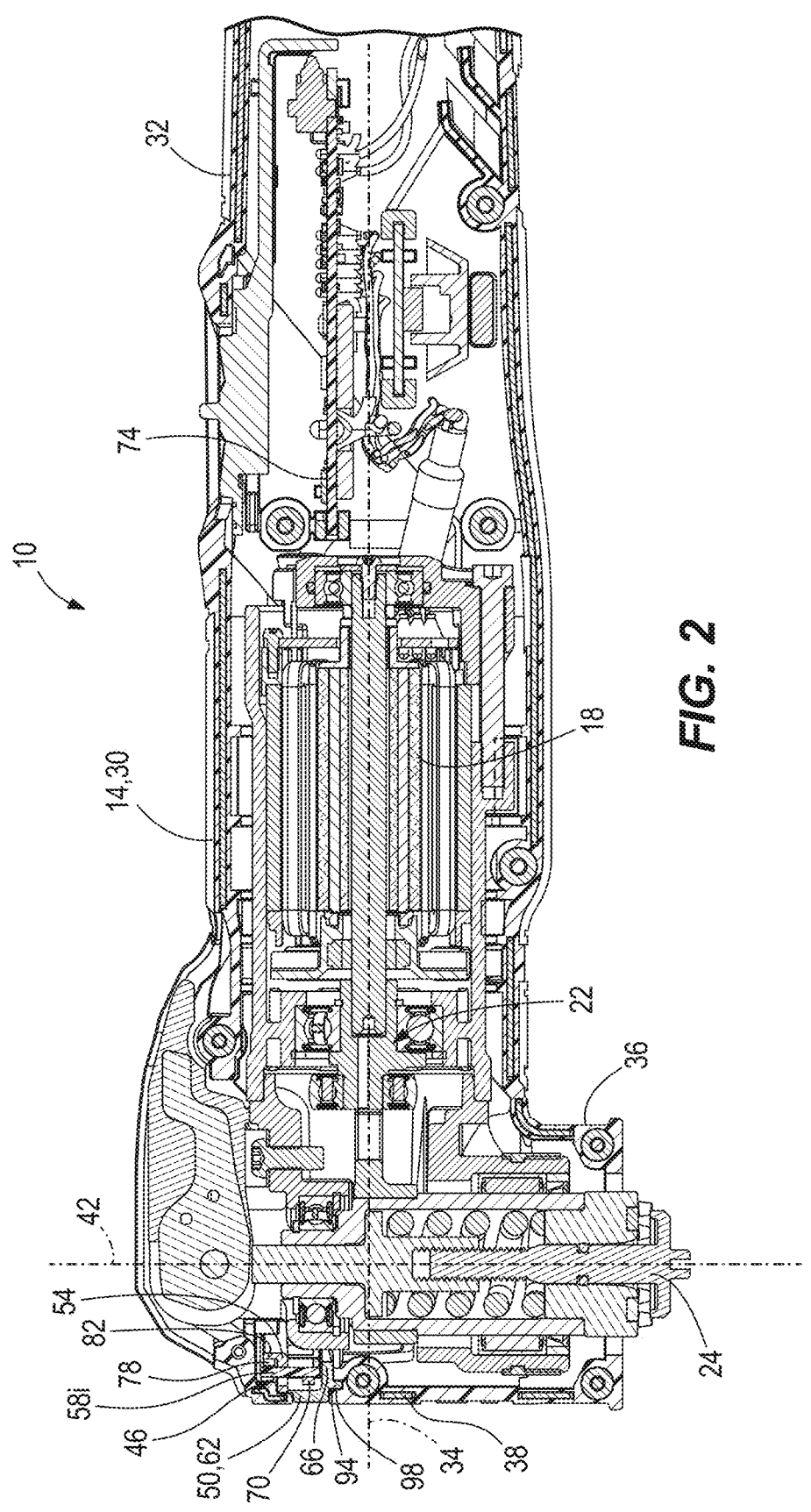
FIG. 2 is a cross-sectional view of the oscillating power tool of FIG. 1.
Figures 3, 4:
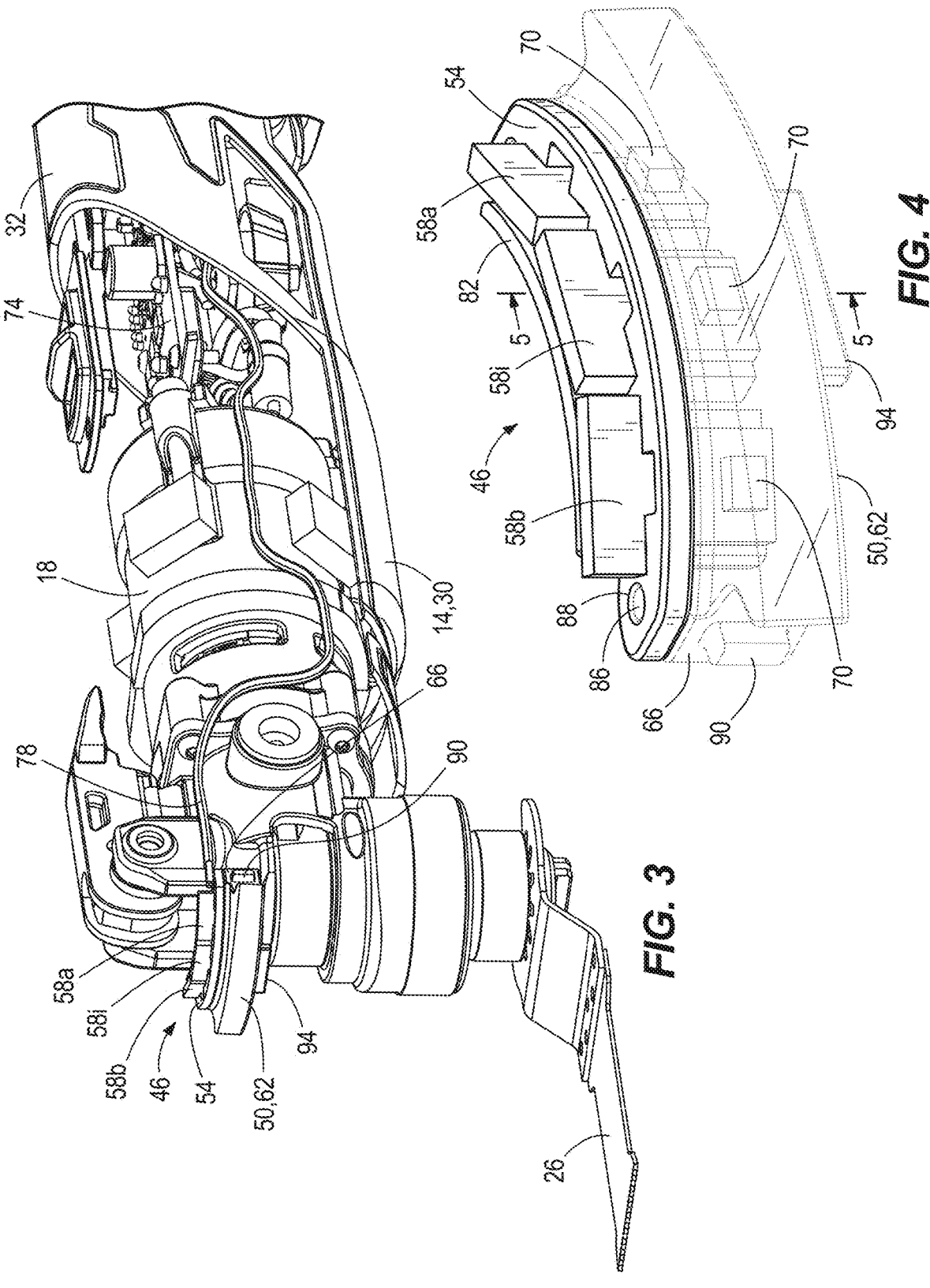
FIG. 3 is a perspective view of the oscillating power tool of FIG. 1, with portions removed.
FIG. 4 is a perspective view of the lighting assembly of the oscillating power tool of FIG. 1.

FIGS. 1-3 illustrate an oscillating power tool 10 including a housing 14, an electric motor 18, a drive mechanism 22 having an output shaft 24 that oscillates in a rotational manner in response to receiving torque from the motor 18, and a tool element 26 (e.g., a blade) coupled to the output shaft 24 for oscillating rotational movement therewith. A battery pack 28 is removably coupled to the housing 14 to provide power to the motor 18. The housing 14 includes a motor housing portion 30 in which the motor 18 is positioned, a handle portion 32 rearward of the motor housing portion 30 defining a handle axis 34, and a head portion 36, from which the output shaft 24 extends, forward of the motor housing portion 30. The head portion 36 includes a front face 38 that is intersected by the handle axis 34. The handle axis 34 also intersects the battery pack. As shown in FIG. 2, the head portion 36 is oriented transverse to the motor housing and handle portions 30, 32 of the housing 14, with the output shaft 24 defining an output axis 42 that is perpendicular to the handle axis 34.

Figures 5, 6:
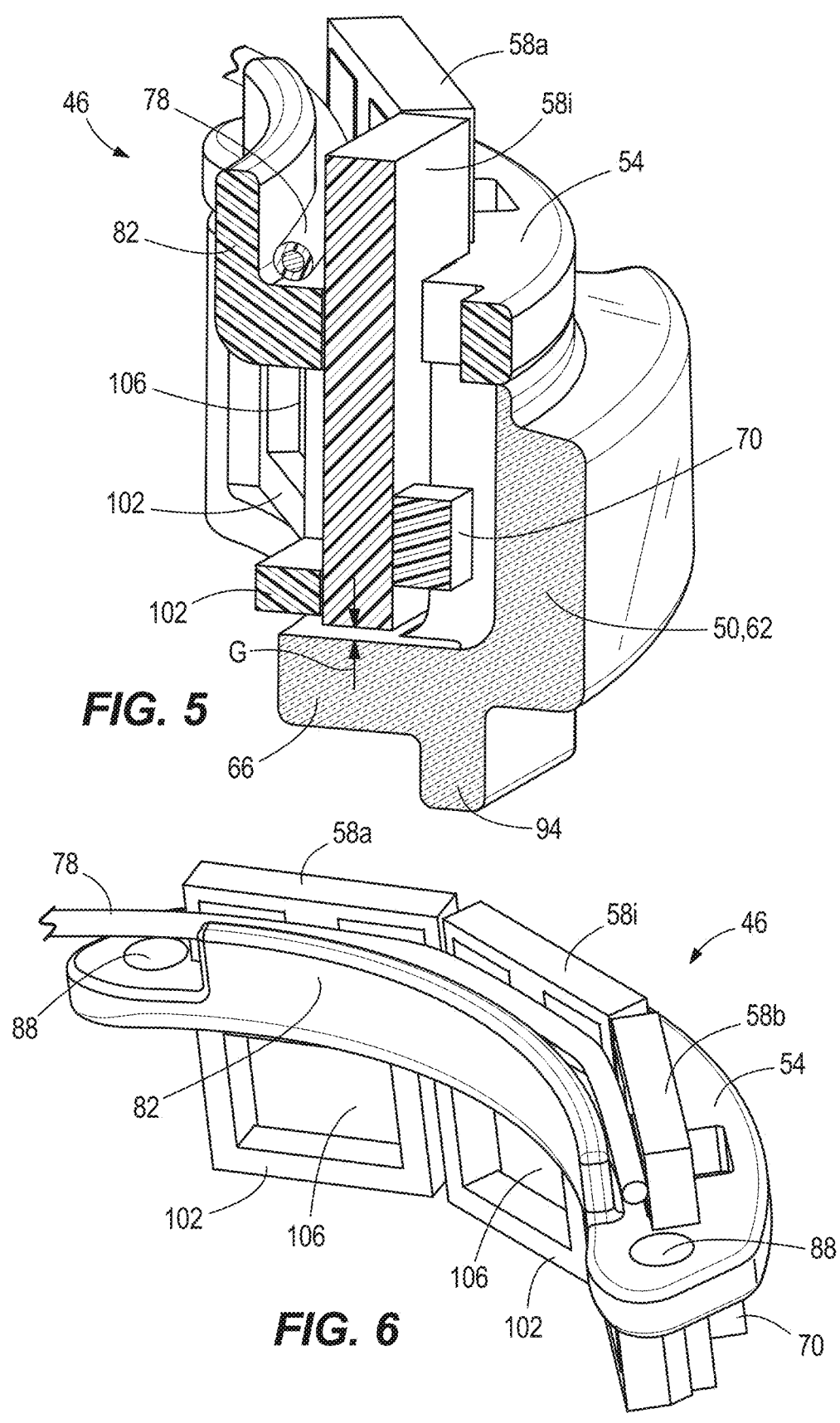
FIG. 5 is a cross-sectional view of the lighting assembly of FIG. 4.
FIG. 6 is a rear perspective view of the lighting assembly of FIG. 4, with portions removed.

As shown in FIGS. 2-6, the tool 10 also includes a lighting assembly 46. The lighting assembly 46 includes a transparent lens 50 arranged on the front face 38, a holder 54 coupled to the lens 50, and a plurality of printed circuit boards (PCBs) 58 coupled to the holder 54. The plurality of PCBs 58 include a first PCB 58a, a last PCB 58b, and an intermediate PCB 58i between the first and last PCBs 58a, 58b. In the illustrated embodiment, there is only one intermediate PCB 58i between the first and last PCBs 58a, 58b, but in other embodiments, there can be no intermediate PCBs 58i or more than one intermediate PCBs 58i between the first and last PCBs 58a, 58b. In the illustrated embodiment, the holder 54 is opaque but in other embodiments, the holder 54 can be transparent. The lens 50 includes an arcuate external portion 62 that is visible from outside the housing 14 and is flush with the front face 38. The lens 50 also includes an internal portion 66, a portion of which extends underneath the PCBs 58. As shown in FIG. 5, a gap G is defined between each of the PCBs 58 and the internal portion 66 in a direction perpendicular to the handle axis 34, such that there is no contact between the PCBs 58 and the lens 50. The lighting assembly 46 also includes a plurality of light emitting diodes (LEDs) 70. Each LED 70 is arranged on one of the PCBs 58 behind the external portion 62, such that the LEDs 70 can emit light through the external portion 62 to illuminate a workpiece upon which work is performed by the tool element 26.

As shown in FIGS. 2 and 3, the PCBs 58 are electrically coupled to a power and control source, such as a control circuit board 74 arranged in the housing 14, via a plurality of wires 78. As shown in FIG. 6, the holder 54 includes a rib 82, and the wires 78 are routed from the PCBs 58 to the control circuit board 74 between the PCBs 58 and the rib 82. The rib 82 helps secure the wires 78 within the housing 14.

As shown in FIG. 4, the lens 50 includes a pair of posts 86 (only one of which is shown in FIG. 4) that fit within a corresponding pair of bores 88 within the holder 54 to couple the holder 54 to the lens 50. In other embodiments, the lens 50 includes a pair of bores and the holder includes a pair of posts to connect the holder 54 to the lens 50. The lens 50 also includes a pair of oppositely-arranged side protrusions 90 (FIG. 7) that are received into corresponding side recesses 92 in the head portion 36 to assist in connecting the lens 50 to the head portion 36. The lens 50 also includes a lower protrusion 94 that is received into a lower recess 98 (FIG. 2) in the head portion 36, also to assist in connecting the lens 50 to the head portion 36.

As shown in FIG. 6, the holder 54 includes a plurality of frames 102 extending away from the rib 82. Each frame 102 extends along a corresponding PCB 58 and includes a recess 106. When the lighting assembly 46 is assembled, these frames 102 function as potting boats, such that an adhesive is added to the recesses 106 to respectively secure the PCBs 58 to the holder 54.

Figure 7:
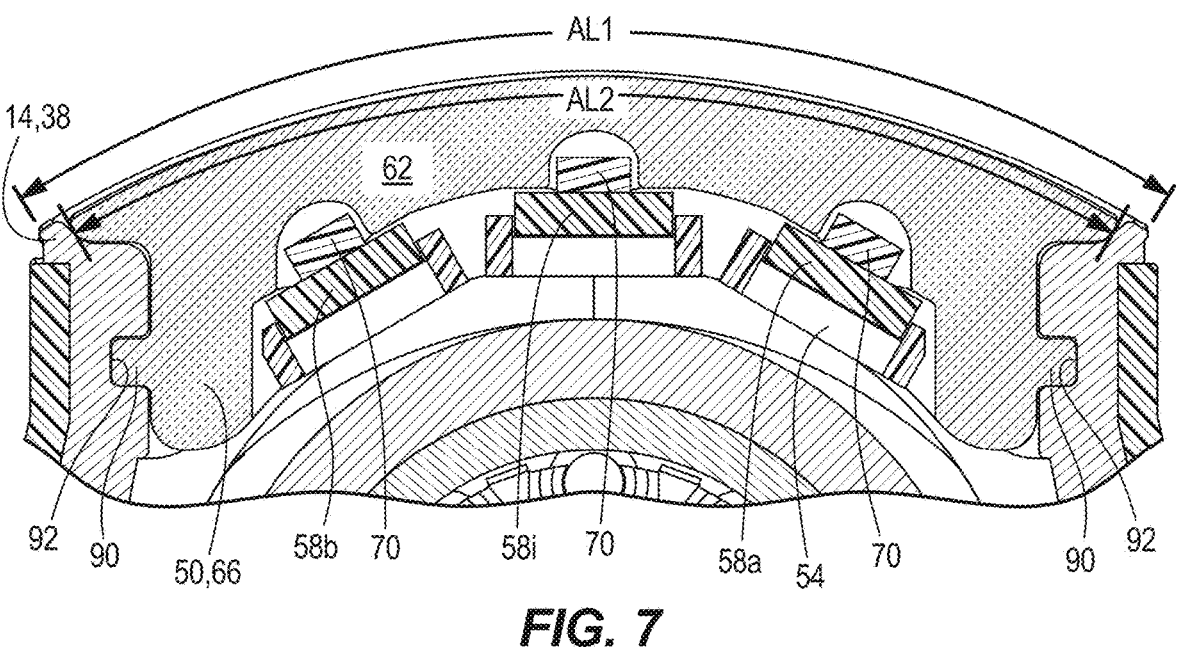
FIG. 7 is a cross-sectional view of the oscillating power tool of FIG. 1.

As shown in FIG. 7, the front face 38 is curvilinear and has a first arc length AL1 and the external portion 62 of the lens 50 is curvilinear and has a second arc length AL2. In some embodiments, the second arc length AL2 is at least 50% of the first arc length AL1, such in response to being activated, the LEDs 70 are configured to project a wide-angle beam of light through the lens 50. In some embodiments, the second arc length AL2 is at least 75% of the first arc length AL1. In the illustrated embodiment, the second arc length AL2 is at least 90% of the first arc length AL1. Because the external portion 62 of the lens 50 extends so far across the front face 38, the wide-angle beam of light is projected by the LEDs 70 through the lens 50 is cast on the workpiece into which the blade 26 is cutting, making working in dimly-lit conditions much easier for an operator.

Figure 8:
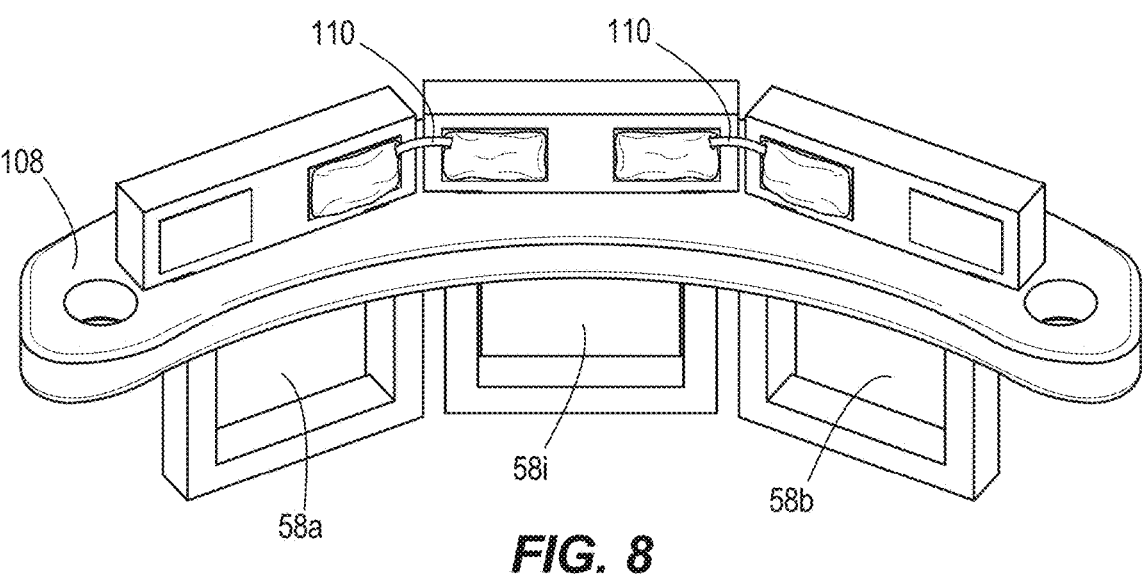
FIG. 8 is a perspective view of a portion of the lighting assembly of FIG. 4 during a first assembly step.
Figure 9:
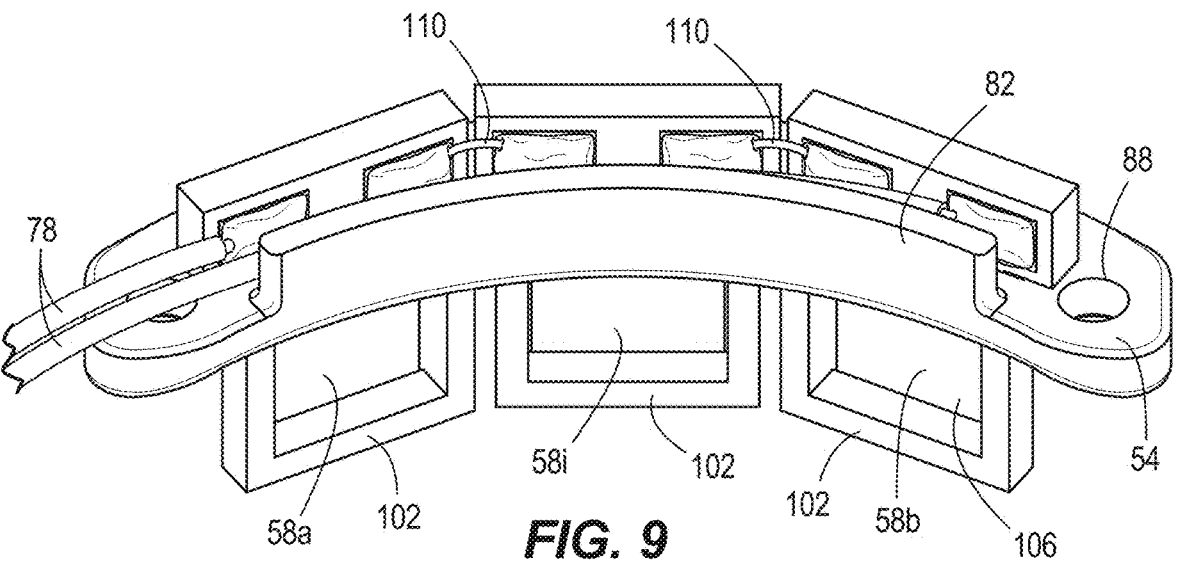
FIG. 9 is a perspective view of a portion of the lighting assembly of FIG. 4 during a second assembly step.
Figure 10:
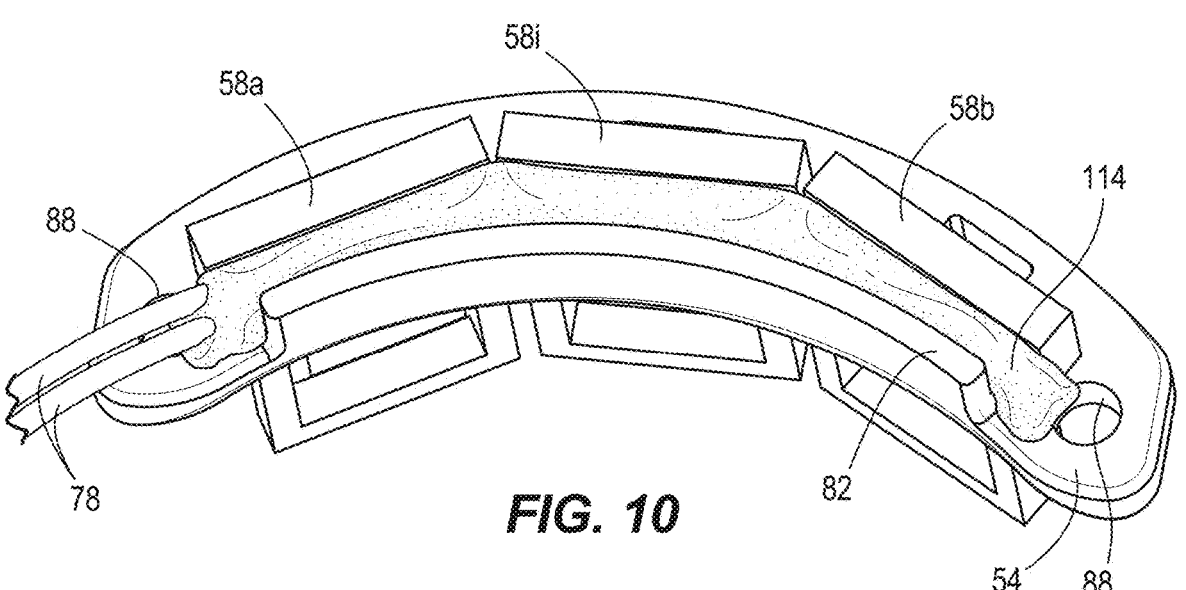
FIG. 10 is a perspective view of a portion of the lighting assembly of FIG. 4 during a third assembly step.

In some embodiments, a portion of the lighting assembly 46 is assembled as described below and shown in FIGS. 8-10. As shown in FIG. 8, the PCBs 58 are first set in a temporary fixture 108 that mimics the structure of the holder 54. Specifically, the temporary fixture 108 positions the PCBs 58 in a semi-circular formation to mimic the subsequent semi-circular formation of the PCBs 58 in the holder 54. After being set in the temporary fixture 108, each pair of adjacent PCBs 58 is electrically connected with solid bridge conductors 110, thereby connecting the PCBs 58 (and the attached LEDs 70) in series and helping to maintain the PCBs 58 in the semi-circular formation. The solid bridge conductors 110 are bent to a curvilinear shape before they are soldered to the PCBs 58. After the solid bridge conductors 110 are soldered to the PCBs 58, the wires 78 are attached to the first and last PCBs 58a, 58b, and the PCBs 58 are removed from the temporary fixture 108 and arranged in the holder 54, pre-arranged in the semi-circular formation, as shown in FIG. 9. The wires 78 are then routed along the rib 82. As shown in FIG. 10, a layer of potting material 114 (e.g., an adhesive) is then applied over the wires 78 adjacent the rib 82 to further secure the wires 78 in the holder 54. Also, as noted above, adhesive is added to the recesses 106 to respectively secure the PCBs 58 to the holder 54.

Various features of the invention are set forth in the claims.

The invention claimed is:

1. An oscillating power tool comprising:

a housing including a handle portion defining a handle axis, and a head portion defining an output axis that is perpendicular to the handle axis, the head portion including a front face that is intersected by the handle axis;

a motor and a drive mechanism positioned within the housing, the drive mechanism including an output shaft configured to oscillate about the output axis in a rotational manner in response receiving torque from the motor; and a lighting assembly configured to illuminate a workpiece in front of the head portion of the housing, the lighting assembly including a lens arranged on the front face of the housing, a holder coupled to the lens, a plurality of printed circuit boards supported by the holder, and a light emitting diode arranged on each of the plurality of printed circuit boards, wherein, in response to being activated, the light emitting diodes are configured to project a wide-angle beam of light through the lens.

2. The oscillating power tool of claim 1, wherein the front face has a first arc length, wherein an external portion of the lens has a second arc length, and wherein the second arc length is at least 50 percent of the first arc length.

3. The oscillating power tool of claim 2, wherein the second arc length is at least 75 percent of the first arc length.

4. The oscillating power tool of claim 3, wherein the second arc length is at least 90 percent of the first arc length.

5. The oscillating power tool of claim 1, further comprising one or more wires electrically connecting the light emitting diodes to a power source, wherein the holder includes a rib, and wherein the one or more wires are arranged between the rib and the plurality of printed circuit boards.

6. The oscillating power tool of claim 5, wherein the power source is a control circuit board.

7. The oscillating power tool of claim 5, further comprising an adhesive on the one or more wires between the rib and the plurality of printed circuit boards.

8. The oscillating power tool of claim 1, wherein the lens includes an external portion that is visible from outside the housing and an internal portion that extends underneath the plurality of printed circuit boards, and wherein a gap is defined between each printed circuit board and the internal portion in a direction perpendicular to the handle axis.

9. The oscillating power tool of claim 1, wherein the lens is transparent and the holder is opaque.

10. The oscillating power tool of claim 1, wherein the holder includes a plurality of frames respectively extending along the plurality of printed circuit boards, wherein each frame defines a recess, and wherein adhesive is arranged in each recess to secure, respectively, each printed circuit board to the holder.

11. The oscillating power tool of claim 1, wherein the lens has a protrusion that extends into a corresponding recess in the head portion of the housing to couple the lens to the housing.

12. The oscillating power tool of claim 11, wherein the protrusion is a lower protrusion and the recess is a lower recess, and wherein the lens includes a pair of oppositely-arranged side protrusions that respectively extend into a pair of corresponding side recesses in the head portion of the housing.

13. The oscillating power tool of claim 1, wherein the lens includes a post that fits within a corresponding bore in the holder to couple the holder to the lens.

14. The oscillating power tool of claim 1, further comprising a battery pack to provide power to the motor and the plurality of printed circuit boards.

15. The oscillating power tool of claim 14, wherein the battery pack is intersected by the handle axis.

16. An oscillating power tool comprising:

a housing including a handle portion defining a handle axis, and a head portion defining an output axis that is perpendicular to the handle axis, the head portion including a front face that is intersected by the handle axis;

a motor and a drive mechanism positioned within the housing, the drive mechanism including an output shaft configured to oscillate about the output axis in a rotational manner in response receiving torque from the motor; and a lighting assembly configured to illuminate a workpiece in front of the head portion of the housing, the lighting assembly including a lens arranged on the front face of the housing, the lens including an arcuate external portion that is visible from outside the housing and is flush with the front face, a holder coupled to the lens, a plurality of printed circuit boards supported by the holder, and a light emitting diode arranged on each of the plurality of printed circuit boards, wherein, in response to being activated, the light emitting diodes are configured to project a wide-angle beam of light through the lens.

17. The oscillating power tool of claim 16, wherein the front face has a first arc length, the arcuate external portion of the lens has a second arc length, and wherein the second arc length is at least 50 percent of the first arc length.

18. The oscillating power tool of claim 17, wherein the second arc length is at least 75 percent of the first arc length.

19. The oscillating power tool of claim 18, wherein the second arc length is at least 90 percent of the first arc length.

20. The oscillating power tool of claim 16, wherein the holder includes a plurality of frames respectively extending along the plurality of printed circuit boards, each frame defining a recess, and wherein adhesive is arranged in each recess to secure, respectively, each printed circuit board to the holder.

\*   \*   \*   \*   \*